Jan. 16, 1968     R. M. DESCHAMPS     3,364,069
PROCESS OF TREATING STORAGE BATTERIES AND OTHER ELECTROCHEMICAL
POWER SOURCES OR ELECTROLYTIC CELLS HAVING
SPIRALLY WOUND ELECTRODES Filed Oct. 9, 1963     7 Sheets-Sheet 1

INVENTOR.
ROBERT MARCEL DESCHAMPS

BY

ATTORNEYS

INVENTOR.
ROBERT MARCEL DESCHAMPS

Jan. 16, 1968 R. M. DESCHAMPS 3,364,069
PROCESS OF TREATING STORAGE BATTERIES AND OTHER ELECTROCHEMICAL
POWER SOURCES OR ELECTROLYTIC CELLS HAVING
SPIRALLY WOUND ELECTRODES
Filed Oct. 9, 1963 7 Sheets-Sheet 6

INVENTOR.
ROBERT MARCEL DESCHAMPS
BY
Kenyon & Kenyon
ATTORNEYS

Jan. 16, 1968     R. M. DESCHAMPS     3,364,069
PROCESS OF TREATING STORAGE BATTERIES AND OTHER ELECTROCHEMICAL
POWER SOURCES OR ELECTROLYTIC CELLS HAVING
SPIRALLY WOUND ELECTRODES
Filed Oct. 9, 1963                                7 Sheets-Sheet 7

INVENTOR.
ROBERT MARCEL DESCHAMPS
BY
ATTORNEYS

United States Patent Office 3,364,069
Patented Jan. 16, 1968

3,364,069
PROCESS OF TREATING STORAGE BATTERIES AND OTHER ELECTROCHEMICAL POWER SOURCES OR ELECTROLYTIC CELLS HAVING SPIRALLY WOUND ELECTRODES
Robert Marcel Deschamps, Paris, France, assignor to Societe des Accumulateurs Fixes et de Traction (Société Anonyme), Romainville, France, a corporation of France
Filed Oct. 9, 1963, Ser. No. 314,902
Claims priority, application France, Oct. 13, 1962, 912,187
16 Claims. (Cl. 136—13)

This invention relates to improvements in electrochemical power sources, electrolytic cells and more particularly in storage batteries, for holding electrodes together when the electrodes are wound in a spiral. This invention is especially interesting for sealed cells when it is desired to have them operate such that only insubstantial quantities of electrolysis products go through the gas state, but this invention can also be applied to other kinds of storage cells.

As disclosed in United States Patent No. 2,646,455 for "Electrolytic Cell and Battery" which was filed by R. Jeannin and issued on July 21, 1953, the method of making storage cells by compressing a block of preferably thin, sintered carrier electrodes and suitable separators before the block of electrodes and separators is placed in a casing is well known. By this method, the gap between electrodes of opposite polarity can be reduced to a minimum and the operation of the cell enhanced without substantial gaseous evolution at the end of a charge and during overcharge. This is true as long as the apparent current density is lower than a given limit or critical density. Even if the density exceeds this limit, the amount of gas evolved in a cell made by this method remains very low and may even be negligible as compared to the amount calculated by Faraday's law.

It is also possible to increase the value of the critical current density by means such as those described in French Patent 1,301,369 which was filed by D. Stanimirovitch on July 5, 1961, and its corresponding United States application Ser. No. 207,180 for "Electrolytic Cells and More Especially in Gas Tight Storage Cells Operating Without Gas Evolution," which was filed on July 3, 1962, as well as in United States application Ser. No. 285,324 for "Alkaline Storage Cells Having High Charging Rate," which was filed by D. Stanimirovitch on June 4, 1963. Such means make use, in one way or another, of an overpressure of one of the gases produced by electrolysis, for example, oxygen, the overpressure being created either by an initial supply of oxygen or by the cell operation itself.

One explanation advanced for the operation of cells of the type described which function without gas evolution at either the end of a charge or during overcharge, is that secondary reactions take place in the cathodic compartments due to dissolved oxygen coming by diffusion from the anode where the oxygen is formed. But whatever the nature of such secondary reactions is, and whatever explanations are given, diffusion, thermodiffusion or convection must render such a transfer of electrolysis products possible.

Experiments have shown that the transfer due to diffusion becomes more significant as the distance between electrodes of opposite polarity is decreased. This is in accordance with the well-known Fick's law relating to diffusion.

Thus, there is a practical interest in maintaining as small a distance as possible, for example, of 0.3 mm. or less between electrodes of opposite polarity. At the same time, there is an interest in keeping the spacing distance between electrodes of opposite polarity as uniform as possible. When flat electrodes are used, it is possible to either compress the block of electrodes and separators as mentioned above, or to compress the electrodes themselves before they are placed in a casing, in order to make them more planar and thereby facilitate a construction in which the electrodes are closely spaced. Such an arrangement is described in said Jeannin U.S. Patent No. 2,646,455.

Spiraly wound electrodes are also known to the art. It is not possible, however, to maintain a uniform small distance of, for example, 0.3 mm. or less between spirally wound electrodes by the procedures just discussed above. Such electrodes are first wound into coil form with the interposition of suitable separators, then the wound assembly is placed in a cylindrical container which is used as the cell casing. For this process of cell manufacture, the outer diameter of the wound assembly must be less than the inner diameter of the container. When the assembly is placed in the container a partial unwinding takes place due to elastic forces similar to those which make a wound spring tend to unwind, with the outer spires apparently unwinding first. As a result, once the wound assembly is placed in the container at least the outer spires, portions or turns of the electrodes and separator do not engage each other as tightly as they did when they were first wound together. This destroys the original uniformity and close spacing created by the original tight winding of the assembly. As a result, also, the desired spacing between the electrodes is destroyed at least in the outer spires of the wound assembly and in addition overall uniformity of spacing throughout the assembly is destroyed.

An object of the present invention is to provide ways for remedying this unwinding tendency of the electrode separator assembly and providing electrochemical power sources or electrolytic cells in which uniformity of spacing and desired spacing distance between electrodes is maintained.

Another object of this invention is to provide electrochemical power suorces or electrolytic cells, and more particularly storage batteries, which embody arrangements for remedying this unwinding tendency of the electrode-separator assembly and to maintain substantial uniformity of separation and spacing between the electrodes.

Other objects and features of the invention will become apparent from the following description and the accompanying drawings forming a part hereof, in which.

Generally, the arrangements provided in this invention for remedying the unwinding of tight spirally wound electrodes in an electrode-separator assembly comprise introducing the wound electrode-separator assembly into the container constituting the cell casing as discussed above, and then permanently deforming the container in order to compel at least the outer spires of the spiral electrode-separator assembly to re-engage each other tightly. The natural tendency of the inner spires to unwind then maintains the whole spiral assembly in a state of equilibrium wherein all the spires are firmly pressed together, thus providing the maintenance of the required uniform spacing between the electrodes.

The permanent deformation of the cell container can be imparted to the entire wall of the container or only to parts of it. With the latter method, lengthwise grooves which are parallel to the container axis, circular grooves which are perpendicular to said axis, or helicoidal grooves which are oblique to said axis may be employed. With the former method, a small reduction of the diameter of the cylindrical container after the wound electrode-separator assembly has been placed in it, quite possibly only a few tenths of a millimeter, is generally sufficient. This is due to the fact that even if only the outer spires are brought closer together, the radial compressive force is directed at the areas where the average circumferential dimension of the spires is the greatest. With the outer spires brought closer together by an entire or partial reduction in the diameter of the container, the inner spires tend to maintain all of the spires, the outer spires as well as the inner ones, in a state of mutual compression due to the tendency of the inner spires to unwind. The dimensional reduction of the container may be realized in various ways, for example, by passing the container through a stationary die, by clamping it in a press or by passing it through a rotating die, as will be hereinafter described.

Figure 1:
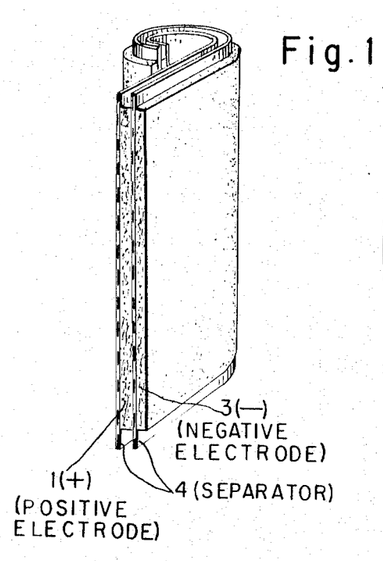
FIG. 1 is a perspective view of a partially wound spiral electrode-separator assembly.
Figure 2:
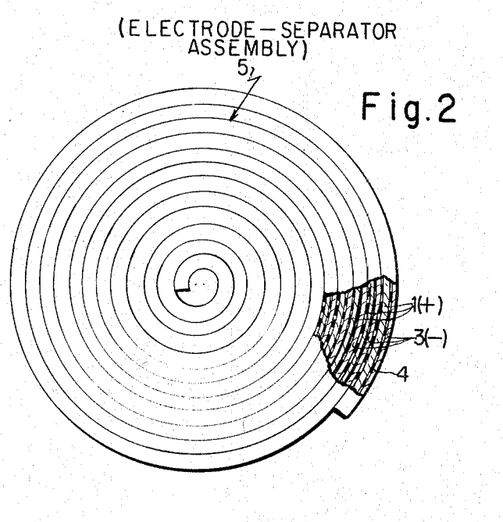
FIG. 2 is a partially broken away plan view of a tight spirally wound electrode-separator assembly in which the electrodes are closely and uniformly spaced with respect to one another by the separator with the individual spires of the electrodes in intimate contact with the adjoining faces of the separator.
Figure 3:
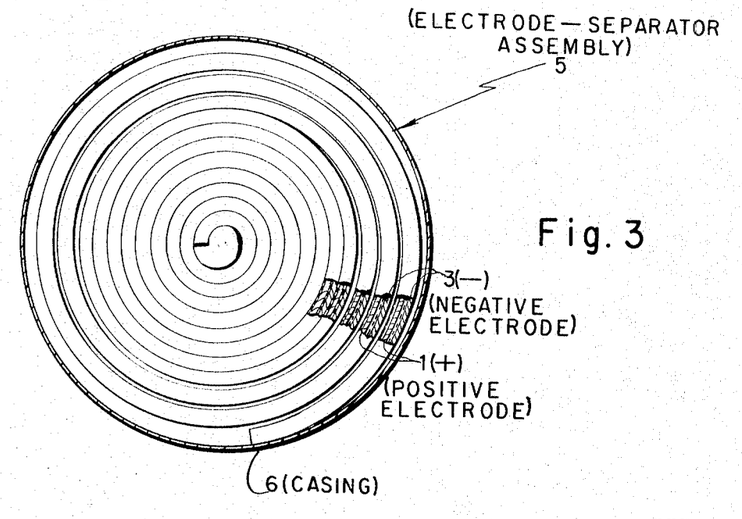
FIG. 3 is a partially broken away plan view of a spirally wound electrode assembly in which at least the outer spires of the electrodes are spaced apart from one another as a result of unwinding tendencies.
Figure 4:
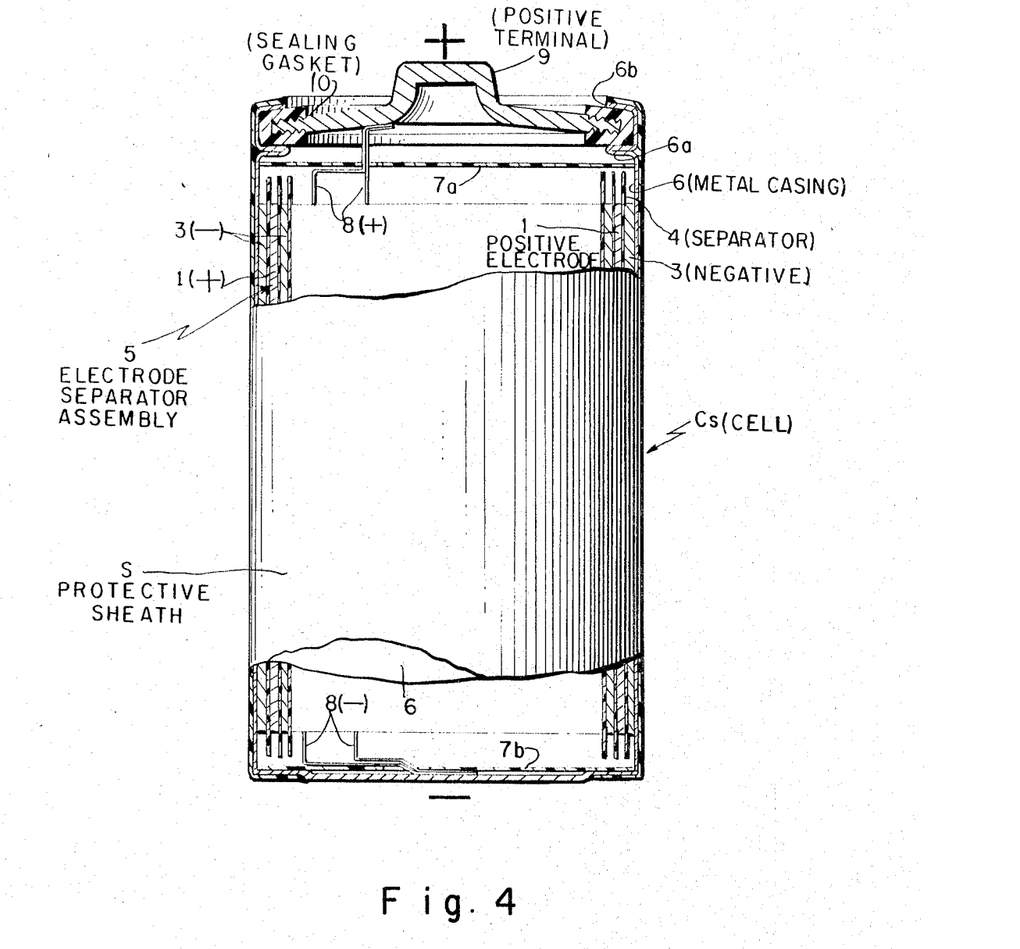
FIG. 4 is a partialy broken away side elevation of a sealed cylindrical cell with a spirally wound electrode-separator assembly therein.

Turning to the figures, FIG. 1 is a perspective view of a partially wound, spiral electrode assembly, and shows a thin positive electrode 1 preferably of the thin sintered type separated from a thin negative electrode 3 also preferably of the thin sintered type by means of a thin separator 4. FIGURE 2 shows the same three elements as part of a fully and tightly wound spiral electrode assembly 5 in which the electrodes are uniformly and closely spaced with respect to one another to produce a spacing not exceeding 0.3 mm. As discussed above, this is how they would normally appear before they are inserted into a cell casing 6 (FIG. 4). When inserted into a metal casing 6, preferably as shown in FIGS. 2 and 4, the outer spires of the electrodes in the assembly 5 tend to separate from one another. This effect is illustrated diagrammatically in FIG. 3. When the outer spires unwind due to the elastic forces discussed earlier, the spacings between the electrodes increase and become non-uniform. This unwinding of the outer spires thus destroys uniformity of spacing and may cause spacing between the electrodes that in some areas, particularly in the outer spires exceeds the desired spacing.

In the cell construction itself, as seen in FIG. 4, insulating discs 7a and 7b of suitable non-conductive material are located above and below the coiled electrode-separator assembly 5 inside of the metal container 6. The negative electrode 3 is connected to the bottom of casing 6 by soldered nickel lead wires 8— which pass through disc 7b so that the casing serves as the negative terminal of the cell. The positive electrode 1 is connected by soldered nickel lead wires 8+ which pass through disc 7a to a metallic positive electrode terminal plate 9 which is insulatively supported from the casing 6 by a sealing gasket 10. The gasket is of nylon or other suitable insulating material. The mouting of positive terminal plate 9 and gasket 10 between crimped portion 6a of casing 6 and turned-over ends 6b thereof is effected after alkaline or other suitable electrolyte (not shown) has been added to the casing 6 or imbibed by capillary action into the separator 4. An hermetic seal is then effected to prevent gas and liquid leakage from the cell C. This may be done, for example, by turning down the lip 6b of container 6 onto the upper surface of gasket 10 to compress the latter between said lip and crimped portion 6a of said container or casing 6. The metallic casing 6 is preferably of steel or other metal or alloy unaffected by the electrolyte used.

Figure 6:
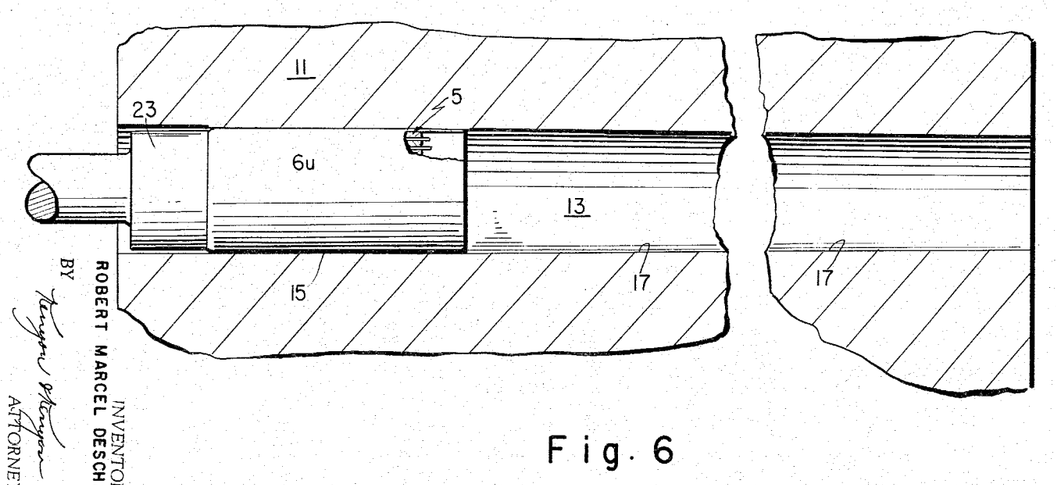
FIG. 6 is a partially diagrammatic and sectional view of apparatus for operating on an unsealed cylindrical cell so that a compressive, container-dimension reducing force can be applied by means of a die with a progressively decreasing internal diameter to eliminate the problems resulting from unwinding tendencies of the spirally wound electrode-separator assembly.

A first embodiment of the arrangements provided for by this invention for remedying the unwinding of wound electrodes in the assembly 5 is illustrated in FIG. 6. In this embodiment, a die 11 comprising a steel block having a bore 13 with a cylindrical portion 15 connected to a tapered cylindrical portion 17 with a progressively decreasing diameter is used. A container 6u, still unsealed but with the spiral electrode separator assembly 5 therein, is introduced into the cylindrical portion 15 of die 11 into which it may penetrate with little friction. Container 6u is then pushed as by a piston 23 through the length of cylindrical portion 15 into the tapered reduced diameter portion 17 and it passes through the latter to its outer end. The tapered cylindrical portion 17 of the bore with a decreasing diameter has a degree of taper such that container 6u is adequately reduced in diameter with but a slight increase in length. The method of this embodiment is particularly suitable where the reduction in diameter of container 6u is not very great, that is to say on the order of 0.1 and 0.3 millimeter. In some cases, it may be advantageous to successively pass the open metal container 6u bearing the coiled electrode-separator assembly 5 through several dies of this type, gradually reducing the container's diameter further each time it passes through a die 11. Thereafter, the metallic casing 6u is sealed in the manner illustrated in FIG. 4 or in any other suitable way to form the cell C of FIG. 4. The insulative protective outer covering sheath S of FIG. 4 is then applied.

Figure 7:
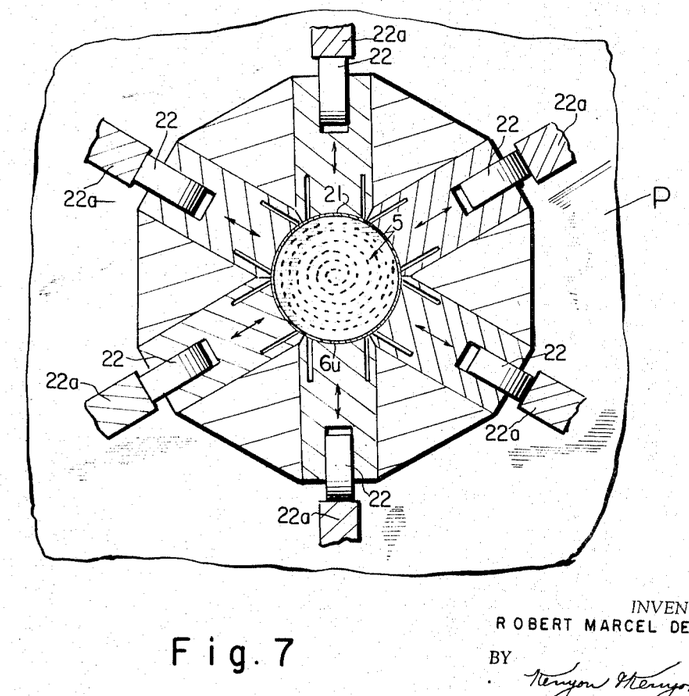
FIG. 7 is a partially diagrammatic and sectional view of apparatus for operating on an unsealed cylindrical cell so that radially compressive container dimension reducing forces may be applied by means of a plurality of radially acting jaw clamps or dies to practice the invention and eliminate the effects of unwinding tendencies.

Another embodiment for practicing this invention is shown in FIG. 7. Herein, again, an unsealed cell Cu is treated. This unsealed cell Cu is comprised by metallic container 6u which contains the spiral electrode-separator assembly 5. In this embodiment a radially compressive force is applied to the wall of a container 6u without sheath S thereon by means of radially displaceable jaw clamps or dies 21 until the elastic limit of the metal constituting container 6u is exceeded and a permanent deformation of the container 6u is obtained which provides the desired reduction in diameter of said container. The reduction may be obtained without moving container 6u relative to the jaw clamps or dies 21, said clamps or dies 21 being forced against the container by means of a press block P having cam surfaces 22a operating on cam rollers 22 which cam rollers 22 are attached to the radially movable jaw clamps 21. The block P is movable in the axial direction of the container 6u and its cam surfaces 22a acting on cam rollers 22 cause the required radial displacement of the jaw clamps or dies 21. Such apparatus in itself is well known and need not be described in detail here. The method of this embodiment is particularly suitable where the desired reduction in container diameter is of the same order as mentioned earlier, that is, 0.1 to 0.3 millimeters.

Figure 8:
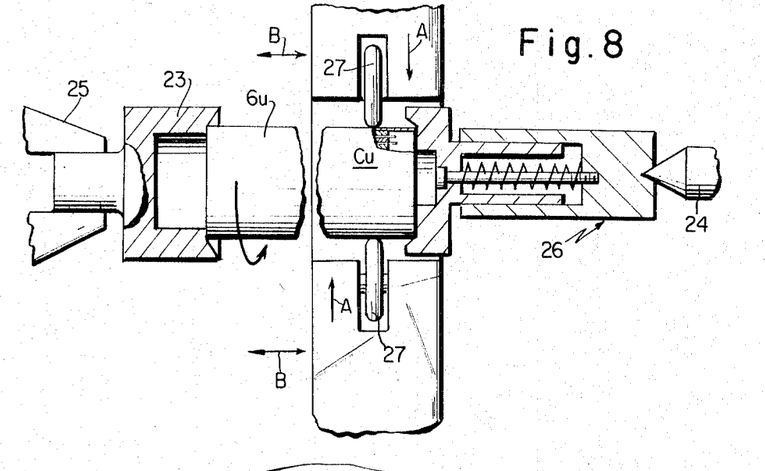
FIG. 8 is a partially diagrammatic and sectional view of apparatus for operating on an unsealed cylindrical cell so that a compressive container dimension reducing force can be applied by means of roller dies while the cell is mounted on a rotating lathe to eliminate the problems caused by the unwinding tendencies of the spiral electrode-separator assembly.

A still further embodiment of this invention is shown in FIG. 8. Here, an unsealed cylindrical cell Cu without sheath S, but containing electrode assembly 5 is placed between the chuck dog 23 and tail stock spindle 24 of a lathe 25, being held in place by appropriate retaining elements 26. Suitable rotating movement is imparted to the chuck dog 23, preferably in the same direction as that in which the electrode-separator components of the assembly 5 were wound. In this embodiment, deforming pressure is exerted on the periphery of container 6u of said cell Cu until the desired reduction in diameter thereof is obtained. This pressure may be exerted by a pair of oppositely disposed roller tools 27 with convex peripheries. These tools are advanced toward each other a set amount and then moved slowly axially of the container 6u, from right to left, and vice versa, as shown by arrows A and B in FIG. 8. These movements of roller tools 27 are continued until the desired reduction in diameter of container 6u is obtained by the rotating movement of the container relative to the roller tools 27 as the latter move along the container's length. The extent of reduction in diameter of the container is preferably of the same order of 0.1 to 0.3 millimeter as effected in the previously described embodiments.

Figures 9, 10:
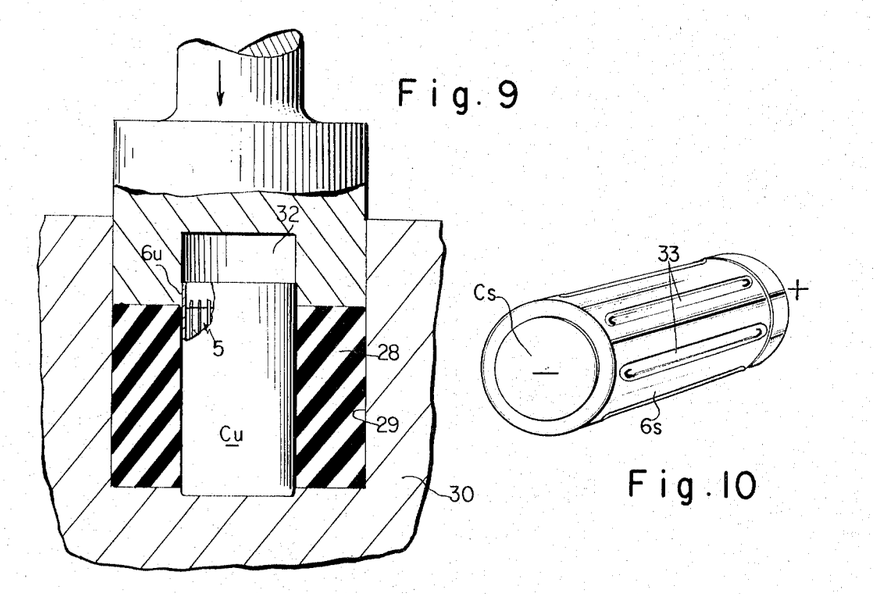
FIG. 9 is a partially diagrammatic and sectional view of apparatus for operating on an unsealed cylindrical cell so that radially compressive forces may be applied by a collar of yieldable material to practice the invention and eliminate the effects of unwinding tendencies.
FIG. 10 is a perspective view of a sealed cylindrical cell embodying the invention with external grooves applied to its casing parallel to its longitudinal axis so that the unwinding tendencies of the electrode-separator assembly therein are counteracted and the problems created thereby eliminated.

Another embodiment for practicing this invention is illustrated in FIG. 9 wherein an unsealed cell Cu is circumscribed by a collar 28 of a yieldable material such as rubber. The collar bearing cell Cu is placed in the bore 29 of a metal die 30. A plunger 31 is provided which has a recess 32 into which the upper end of cell Cu may enter. The plunger 31 is reciprocally movable into and out of bore 29. When plunger 31 is depressed into bore 29, its lower surfaces apply a compressive force to collar 28, which collar is then confined within bore 29. Since collar 28 is confined, it can only expand radially inwardly and exert radially directed pressure inwardly against the outer surface of container 6u of cell Cu which it surrounds. This radially directed pressure or "squeezing effect" of collar 28 serves to reduce the diameter of container 6u. In this way, as with the embodiments earlier described, the windings or spires of the coiled electrode separator assembly 5 are compressed together.

Figure 5:
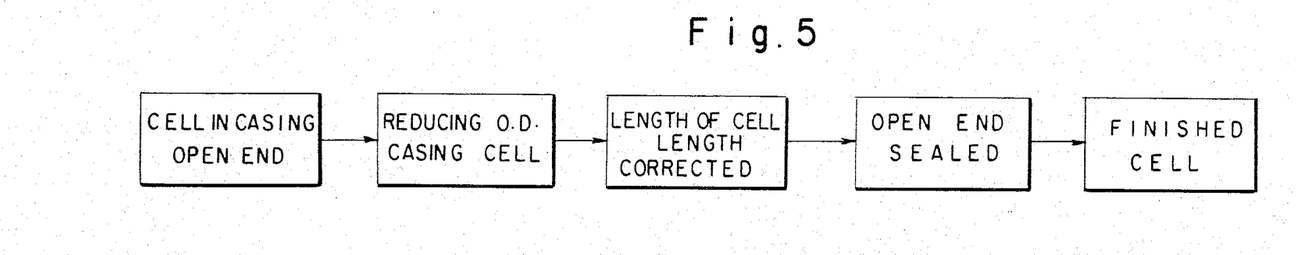
FIG. 5 is a diagrammatic flow chart of a method embodying the invention for operating on a cell initially having an open-ended casing to overcome the unwinding tendency of the spirally wound electrode-separator assembly therein.

The procedure in which the whole cylindrical surface of the container 6u is reduced can be performed most easily upon an open container rather than one which is closed since the reduction in diameter is generally accompanied by an increase in the container's length. As shown in FIG. 5, after the outside diameter of the casing of the container is reduced by a method such as those described above, the length of the cell will generally have to be corrected. The over-all container lengthening effected by the diametrical reduction is small and the necessary length correction can be effected in any suitable way, for example, by trimming excess length from the open end of the container, or by increasing the amount of turning over of portion 6b of said container, or in other apparent ways. The open end of the container may be sealed simultaneously with length correction or subsequently, and the cell then finished, for example, by addition thereto of the protective covering S. Due to the effect which reducing the whole peripheral surface of a container has upon its length, this technique is preferably used in cases where the reduction in diameter is not too great, cases where the desired reduction is in the order of 0.1 millimeter to 0.3 millimeter, for example.

In some cases, it may be desirable to permanently deform only part of the container wall, rather than the whole casing. This is particularly true in the case of already sealed cells. One example of a procedure where only part of the cylindrical surface of a container is deformed is where a series of grooves of a depth adequate to obtain the desired tightening of the electrode-separator assembly winding is impressed into the cylindrical container wall of a sealed cell. Such impressions as shown in FIG. 10 may take the form of shallow grooves 33 applied to the cylindrical wall of the container 6s of a sealed cell Cs to extend parallel with the longitudinal axis of the cell. These grooves 33 preferably are shallow rounded concavities. The grooves may also be disposed perpendicularly to the longitudinal axis, that is in the form of shallow rounded circular impressions 34 (FIG. 11) applied to the cylindrical surface of container 6s' of a sealed cell Cs' or they may be disposed obliquely to the longitudinal axis of the cell Cs'', that is to say they may be one or more shallow rounded helicoidal impressions 35 in the cylindrical wall of the container in the nature of those shown in FIGS. 12 and 13.

Figure 14:
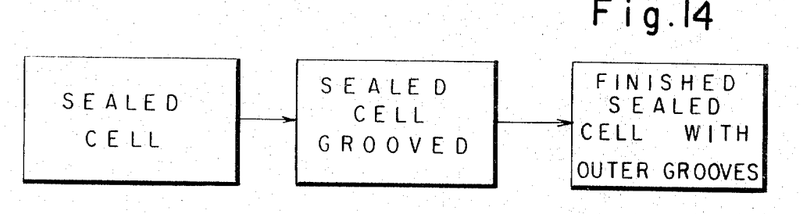
FIG. 14 is a diagrammatic flow chart of a further method for practicing the invention and finishing a sealed cell to solve said problems.

It is possible, therefore, to achieve the objects of this invention, namely, maintenance or restoration of close order formation between the spires of the spirally wound electrode-separator assembly 5 even after the latter has been placed within a casing and the casing has been sealed to form the cell. The steps of such a technique are shown diagrammatically in FIG. 14. The fact that the spirally wound electrodes of a sealed cell can be held or again brought together with desired uniformity and closeness of spacing is a noteworthy characteristic of this invention.

Figure 11:
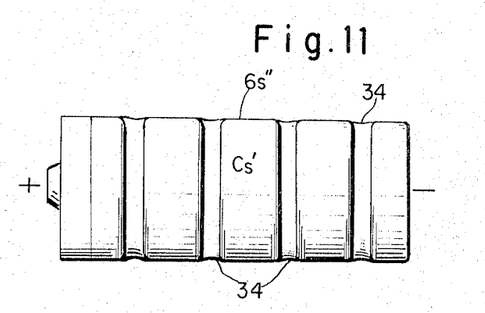
FIG. 11 is a side elevation of a sealed cylindrical cell embodying the invention with external grooves applied to its casing perpendicular to its longitudinal axis to solve the problems created by the unwinding tendencies of the electrode-separator assembly therein.
Figure 12:
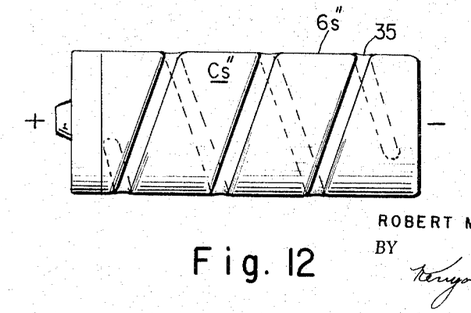
FIG. 12 is a side elevation of a sealed cylindrical cell embodying the invention with a spiral external groove applied to its casing oblique to its longitudinal axis to solve said problems.
Figure 13:
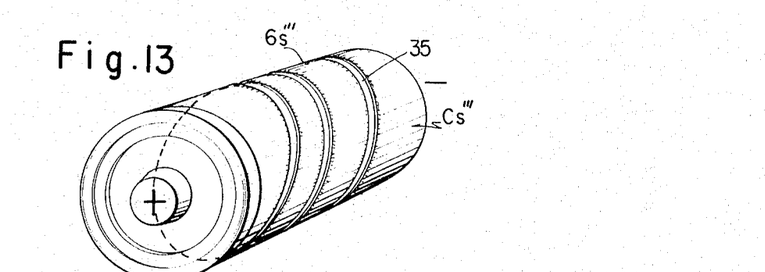
FIG. 13 is a perspective view of a sealed cylindrical cell embodying the invention with a plurality of external grooves applied to its casing oblique to its longitudinal axis to solve said problems.

Straight or longitudinal impressions 33 as illustrated in FIG. 10 having a length less than the length of the container 6s of cell Cs have been found to suffice. More than one groove 33 or 34 or 35 may be used, whether the grooves are parallel, or perpendicular or oblique to the longitudinal axis of the cell as seen in FIGS. 10, 11 and 13, the precise number of grooves depending upon the dimensions of the cell as well as the location of the grooves. When the impressions 33 are parallel to the longitudinal axis of the cell Cs as shown in FIG. 10, preferably three or more are made at regularly spaced intervals. When the impressions 34 are perpendicular to the longitudinal axis of the cell Cs' as shown in FIG. 11, at least two or preferably three or more may be made in the cylindrical wall 6s' of cell Cs'. When the impressions 35 are oblique to the longitudinal axis of the sealed cell Cs" or Cs''' as shown in FIGS. 12 and 13, either one groove 35 or two or more grooves 35 may be used. In order to obtain grooves in the nature of those described, procedures similar to those used in connection with unsealed cells to achieve a reduction in diameter over the entire length of the container may be practiced.

Figures 15, 16, 17, 18:
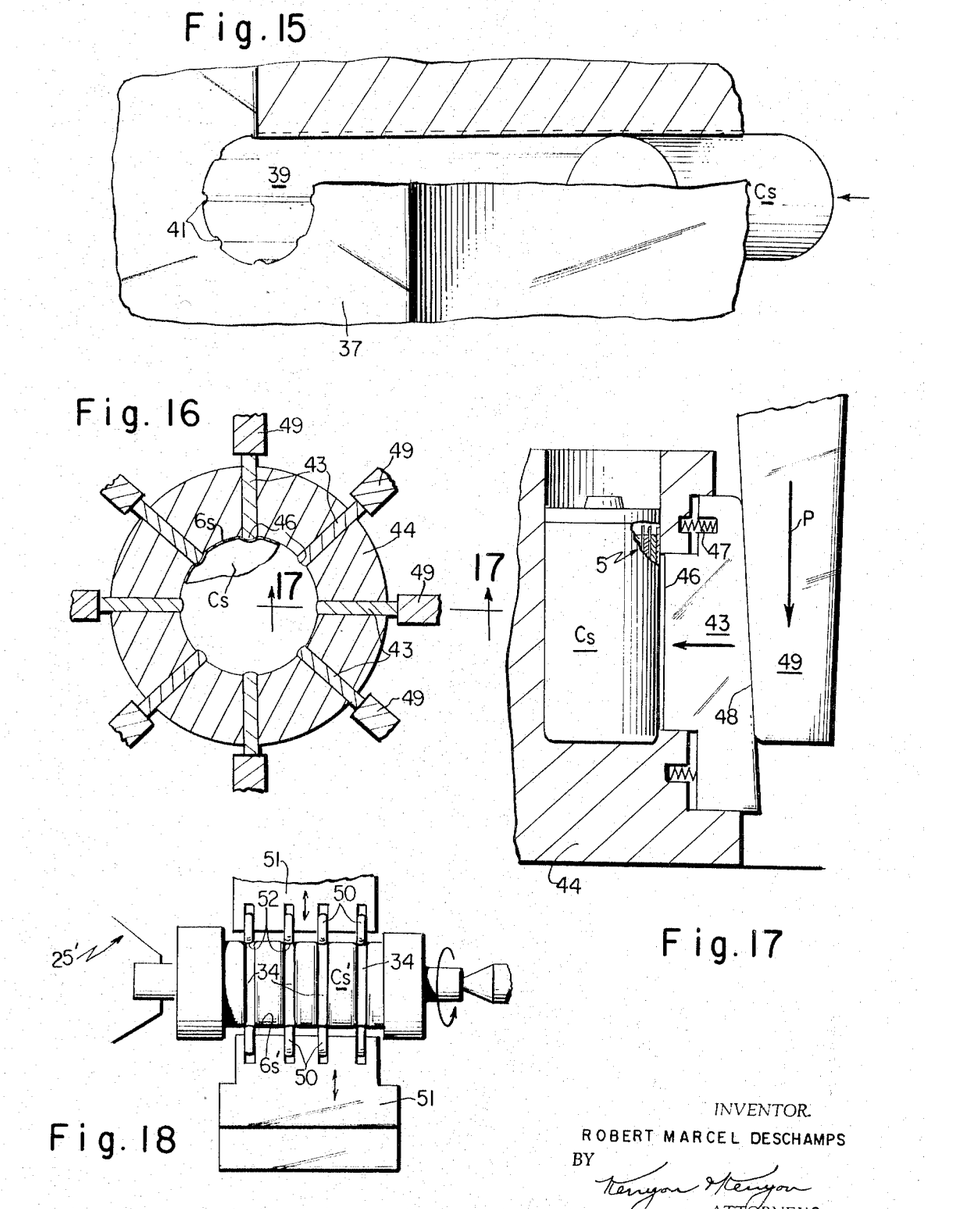
FIG. 15 is a partially broken away perspective and diagrammatic view of a die with a bore having internal protrusions parallel to its longitudinal axis for practicing the invention on a sealed cell.
FIG. 16 is a sectional view of apparatus for use with a cylindrical cell to the wall of which longitudinal grooves may be applied by a plurality of radially directed dies for effecting the objects of this invention and providing the cell of FIG. 10.
FIG. 17 is a fragmentary sectional view of the apparatus of FIG. 16 taken along the plane of line 17—17 of FIG. 16, illustrating how a compressive force may be applied by means of a wedge and spring arrangement and the objects of this invention thereby effected.
FIG. 18 is a partially diagrammatic and partially sectional view of another arrangement for practicing this invention on a sealed cylindrical cell by applying a plurality of external grooves perpendicular to its longitudinal axis with die rollers while the cell is mounted on a rotating lathe, thus providing the cell of FIG. 11.

For example, lengthwise impressions 33 in containers of sealed cells Cs may be made with a die having a suitable cross section. Such a die 37 is shown in FIG. 15, wherein the bore 39 in the die has internal protrusions 41 corresponding to the impressions 33 to be obtained. The sealed cell Cs without its protective sheath S is forced partly through the bore 39 as by a plunger (not shown) and die protrusions 41 form the impressions or grooves 33 except on the upper part.

In another embodiment depicted in FIGS. 16 and 17, grooves or impressions 33 in containers of cells Cs (FIG. 10) may be obtained by impressions thereof in the cylindrical surface of the container 6s of cell Cs by round nosed clamping jaws or dies 43. These jaws or dies 43 are movable radially in the walls of a rigid socket-like member 44 having a central bore 45 to receive the cell Cs. The jaws 43 are forced inwardly radially in any suitable way against the cylindrical surface of container with enough pressure used for a long enough time to exceed the elastic limit of the metal constituting the container 6s so that a permanent deformation of the desired depth in each groove 33 is thereby obtained. In this embodiment, the cell Cs can be sealed prior to the operation or unsealed. It need not be moved relative to the clamping jaws or dies 43 while their rounded noses 46 are impressed into the wall of container 6s. The individual jaws 43 are activated radially inwardly in any suitable mechanical or hydraulic way. For example, as seen more clearly in FIG. 17, each individual jaw 43 is supported in the wall of socket-like member 44 for radial movement through said wall so that its round nose 46 may be projected into bore 45. Spring biasing elements 47 are provided which urge the jaw 43 and its nose 46 outwardly of bore 45. The nose 46 of jaw 43 extends parallel to the longitudinal axis of bore 45 and container 6s of cell Cs which is positioned in said bore. The trailing edge 48 of jaw 43 is inclined relative to the leading edge or nose 46 and is adapted to be engaged by a wedge 49. The leading edge or nose 46 of jaw or die 43 is pressed into container 6s of cell Cs by movement of wedge 49 in the direction of arrow D, and thereby groove 33 is impressed. A plurality of such jaws 43 are used as seen in FIG. 16 to impress a plurality of grooves 33 simultaneously.

FIG. 18 illustrates diagrammatically an embodiment of apparatus whereby circular impressions 34 of FIG. 11 in the container 6s' of Cell Cs' may be obtained. Here, cell Cs' is rotated on a lathe 25' similar to lath 25 of FIG. 8 relative to oppositely located roller dies 50. These dies are carried on blocks 51. The blocks 51 are mounted on tool slide supports (not shown) of the lathe and are movable perpendicularly to the longitudinal axis of the cell Cs' supported in the lathe. The rounded peripheries 52 of these roller dies 50 when moved into the surface of the container 6s' during rotation of cell Cs' by the lathe impress the multiple grooves 34 therein. When this embodiment is used, the direction of rotation of the cell Cs' in the lathe will preferably be the same as the direction in which the spiral electrode assembly contained therein was wound.

Figure 19:
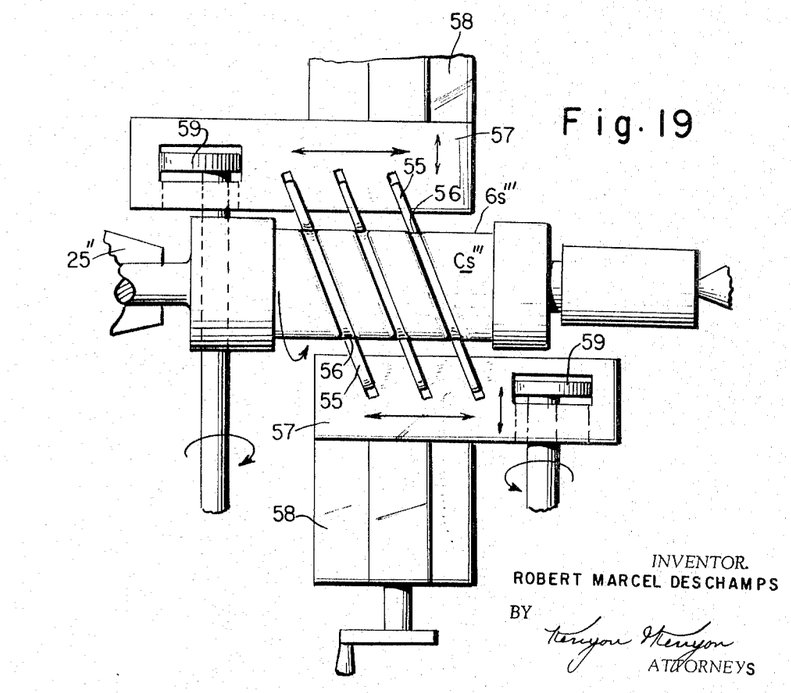
FIG. 19 is a partially diagrammatic and partially sectional view of yet another arrangement for practicing this invention on a sealed cylindrical cell by applying external grooves oblique to its transverse axis with die rollers while the cell is mounted on a rotating lathe thus providing the cell of FIG. 13.

FIG. 19 illustrates an embodiment of apparatus whereby oblique impressions 35 of FIG. 13 may be obtained. Here a cell Cs''' is mounted in the chuck 23" of a lathe 25" and is rotated relative to oppositely located roller dies 55 whose rounded noses 56 are movable so as to press into the surface of the container 6s'''. The roller dies 55 are mounted obliquely in supports 57 which are carried by conventional tool slides 58. Supports 57 are movable perpendicularly to the axial direction of cell Cs'''. These supports 57 of these roller dies are also reciprocally movable as by cam means 59 in the axial direction of the cell Cs''' in synchronism and in timed relation to the speed of rotation of the cell Cs''' in the lathe. Thereby, on rotation of the said cell, multiple helical grooves 35 of FIG. 13 are produced in the surface of container 6s'''. The depth of these grooves can be regulated as needed by manipulation of tool slides 58. To produce the single helical groove 35 of FIG. 12, only one roller die 55 is provided on each support 57.

It is seen therefore that by practicing this invention in the manners described, it is possible to counteract the unwinding tendencies of spirally wound electrode assemblies and achieve substantial uniformity of spacing between the electrodes, which spacing, as has been pointed out at the outset of this specification, is important for the proper operation of cells; and further that the invention may be practiced either upon cells prior to their sealing or upon cells after they have been sealed. The invention may be applied not only to electro-chemical cells of the alkaline electrolyte, nicked-cadmium type, but to all types of cells and power sources containing wound electrode-separator assemblies wherein proper functioning of the cell requires substantial uniformity of spacing to be maintained between the electrodes.

Although specific embodiments of this invention have been described and shown, variations in structural detail and process steps within the scope of the appended claims are possible and are contemplated. There is no intention, therefore, of limitation to the exact structures and processes herein set forth.

What is claimed is:

1. A process for treating cells containing spirally wound electrodes, having separator material interposed between adjacent electrodes, for keeping the spirally wound electrodes of the cell close together and uniformly spaced at substantially the width of said separator material, comprising the steps of inserting spirally wound electrodes into a container, the outer spires of said electrodes having a tendency of unwinding after insertion into said container; and thereafter imparting a permanent deformation to the longitudinal wall of said container; said deformation being of such a magnitude as to cause the outer spires of said spirally wound electrodes to re-engage each other tightly, but not to cause deformation of said electrodes.

2. A process for treating electrochemical power sources containing spirally wound electrodes, having separator material interposed between adjacent electrodes, for keeping the spirally wound electrodes of the electrochemical power source close together and uniformly spaced at substantially the width of said separator material, comprising the steps of positioning a sheet of separator material between a sheet of positive and a sheet of negative electrode material to form an electrode-separator assembly; winding the assembly into a spiral; inserting the spirally wound electrode-separator assembly into a container, the outer spires of said assembly having a tendency of unwinding after insertion into said container; and thereafter imparting a permanent deformation to the longitudinal wall of said container; said deformation being of such a magnitude as to cause the outer spires of said spirally wound electrodes to re-engage each other tightly, but not to cause deformation of said electrodes.

3. The process of claim 2 including the steps of sealing the container after inserting said assembly into said container.

4. A process for treating electrochemical power sources containing spirally wound electrodes, having separator material interposed between adjacent electrodes, for keeping the spirally wound electrodes of the electrochemical power source close together and uniformly spaced at substantially the width of said separator material, comprising the steps of inserting spirally wound electrodes into a container, the outer spires of said electrodes having a tendency of unwinding after insertion into said container; and thereafter compressing the substantially entire longitudinal wall of the container until it is permanently deformed; said compressing of said wall of said chamber being of such a magnitude as to cause the outer spires of said spirally wound electrodes to re-engage each other tightly, but not to cause deformation of said electrodes.

5. The process of claim 4 wherein the longitudinal wall of the container is compressed by forcing the container through a die.

6. The process of claim 4 wherein the longitudinal wall of the container is compressed by forcing clamping means against said wall.

7. The process of claim 4 wherein the longitudinal wall of the container is compressed by pressing a tool toward the wall of the container and rotating the container relative to the tool.

8. The process of claim 7 wherein the container is rotated in the same direction as that in which electrodes within the container are spirally wound.

9. The process of claim 4 wherein the longitudinal wall of the container is compressed by circumscribing the wall of the container with a collar of yieldable material and compressing said material in a direction parallel to the longitudinal axis of the cylinder while confining said material.

10. The process of claim 4 including the further steps of conforming the length of the container to a predetermined dimension and thereafter sealing the container.

11. A process for treating electrochemical power sources containing spirally wound electrodes, having separator material interposed between adjacent electrodes, for keeping the spirally wound electrodes of the electrochemical power source close together and uniformly spaced at substantially the width of said separator material, comprising the steps of inserting spirally wound electrodes into a container, the outer spires of said electrodes having a tendency of unwinding after insertion into said container; and thereafter impressing at least one groove into the longitudinal wall of the container; the depth of said groove being of such a magnitude as to cause the outer spires of said spirally wound electrodes to re-engage each other tightly, but not to cause deformation of said electrodes.

12. The process of claim 11 wherein such groove is impressed into the longitudinal wall of the container by forcing the container through a die.

13. The process of claim 11 wherein such groove is impressed into the longitudinal wall of the container by compressing the container with clamping means.

14. The process of claim 11 wherein such groove is impressed into the longitudinal wall of the container by pressing a tool toward the wall of the container and rotating the container relative to the tool.

15. The process of claim 14 wherein the container is rotated in the same direction as that in which electrodes within the container are spirally wound.

16. The process of claim 11 wherein such groove is impressed into the longitudinal wall of the container by placing a tool against the wall of the container and forcing said tool into said wall by a wedge member.

References Cited

UNITED STATES PATENTS

| | | | |
|---|---|---|---|
| 2,487,499 | 11/1949 | Webb | 136—13 |
| 2,646,455 | 7/1953 | Jeannin | 136—24 |
| 3,081,366 | 3/1963 | Belove | 136—6 |
| 3,081,367 | 3/1963 | Field et al. | 136—13 X |

ALLEN B. CURTIS, *Primary Examiner.*

WINSTON A. DOUGLAS, *Examiner.*

B. J. OHLENDORF, *Assistant Examiner.*